United States Patent

Dehn et al.

Patent Number: 6,136,067
Date of Patent: Oct. 24, 2000

[54] PROCESS OF MONITORING THE OPERABILITY OF A FILTERING PLANT FOR DEDUSTING GASES

[75] Inventors: Günter Dehn, Wesel; Joachim Krein, Darmstadt; Horst Moellenhoff, Mülheim; Joachim Schmitt, Neukirchen-Vluyn, all of Germany

[73] Assignee: Metallgesellschaft Aktiengesellschaft, Frankfurt am Main, Germany

[21] Appl. No.: 09/191,645

[22] Filed: Nov. 13, 1998

[30] Foreign Application Priority Data

Nov. 17, 1997 [DE] Germany ............... 197 50 799

[51] Int. Cl.$^7$ .............................. B01D 35/143
[52] U.S. Cl. .................. 95/20; 95/19; 95/276; 95/280; 96/397; 96/400
[58] Field of Search .................. 55/302; 95/19, 95/20, 276, 280, 278, 279; 431/20; 96/397, 400, 402

[56] References Cited

U.S. PATENT DOCUMENTS

| | | | |
|---|---|---|---|
| 4,856,982 | 8/1989 | Olson | 431/20 |
| 5,174,797 | 12/1992 | Yow, Sr. et al. | 95/20 |
| 5,346,533 | 9/1994 | Jelich et al. | 95/20 |
| 5,348,568 | 9/1994 | Oda et al. | 95/20 |
| 5,417,728 | 5/1995 | Royle | 55/302 |
| 5,607,498 | 3/1997 | Reighard et al. | 95/19 |
| 5,837,017 | 11/1998 | Santschi et al. | 95/20 |

FOREIGN PATENT DOCUMENTS

| | | |
|---|---|---|
| 0 428 862 B1 | 5/1991 | European Pat. Off. . |
| 195 27 311 A1 | 1/1997 | Germany . |

Primary Examiner—David A. Simmons
Assistant Examiner—Minh-Chan T. Pham
Attorney, Agent, or Firm—Morris, McLaughlin & Marcus, P.A.

[57] ABSTRACT

The filtering plant has a plurality of porous, gas-permeable filter elements with at least one raw gas side and at least one clean gas side. The gas to be cleaned (raw gas) flows towards the raw gas side, and the clean gas side is connected with a clean gas passage. Into the clean gas passage and into the filter elements, pulse gas coming from a pressure vessel is introduced for periodically detaching dust adhering at the raw gas side. Via a gas-permeable passage, the pressure vessel is connected with a measuring chamber having a smaller volume than the pressure vessel. While pulse gas flows out of the pressure vessel into the clean gas passage and to the filter elements, the pressure difference $\Delta p = p1 - p2$ is measured and monitored, where p1 is the static pressure in the measuring chamber, and p2 is the static pressure in the pressure vessel. Expediently, an alarm signal is activated when the maximum of the pressure difference falls below a predetermined minimum value.

3 Claims, 1 Drawing Sheet

PROCESS OF MONITORING THE OPERABILITY OF A FILTERING PLANT FOR DEDUSTING GASES

DESCRIPTION

This invention relates to a process of monitoring the operability of a filtering plant for dedusting gases, where the plant comprises a plurality of porous, gas-permeable filter elements with at least one raw gas side and at least one clean gas side, where the gas to be cleaned (raw gas) flows towards the raw gas side, and the clean gas side is connected with a clean gas passage, where pulse gas coming from a pressure vessel is introduced into the clean gas passage and into the filter elements for periodically detaching dust adhering at the raw gas side.

BACKGROUND OF THE INVENTION

Filtering plants of this type are known and described for instance in EP-B-0 428 862 and DE-A-195 27 311. The porous candle filters or filter elements are made for instance of ceramics, fibrous material or also from metal, they may be disposed for instance upright or pendent or in any other position and be connected with the associated clean gas passage. A filtering plant usually has several groups of filter elements, which groups are arranged one beside the other and/or above the other in a housing, where each group can be cleaned separately from the other groups. This requires valves, and it is important to early detect malfunctions of these valves, in order to avoid negative effects on the filter elements.

SUMMARY OF THE INVENTION

It is the object underlying the invention to monitor the operability of the filtering plant and detect in particular mechanical faults, which impair the cleaning by means of pulse gas. In accordance with the invention, this object is solved in the above method in that the pressure vessel is connected via a gas-permeable passage with a measuring chamber having a smaller volume than the pressure vessel, and that while pulse gas flows out of the pressure vessel and into the clean gas passage and to the filter elements, the pressure difference $\Delta p = p1 - p2$ is measured and monitored, where pi is the static pressure in the measuring chamber and p2 is the static pressure in the pressure vessel. The short-time pressure difference between the measuring chamber and the pressure vessel occurs with the abrupt outflow of the pulse gas from the pressure vessel, because the gas, e.g. air, only flows off with a delay from the measuring chamber through the passage partly into the pressure vessel.

It may be expedient to provide a movable obstacle in the passage between the measuring chamber and the pressure vessel, which can be adjusted or be replaced easily and determines the flow cross-section in the interior of the passage in a controllable manner.

BRIEF DESCRIPTION OF THE DRAWINGS

Embodiments of the process will now be explained with reference to the drawing, wherein.

DETAILED DESCRIPTION

Figure 1:
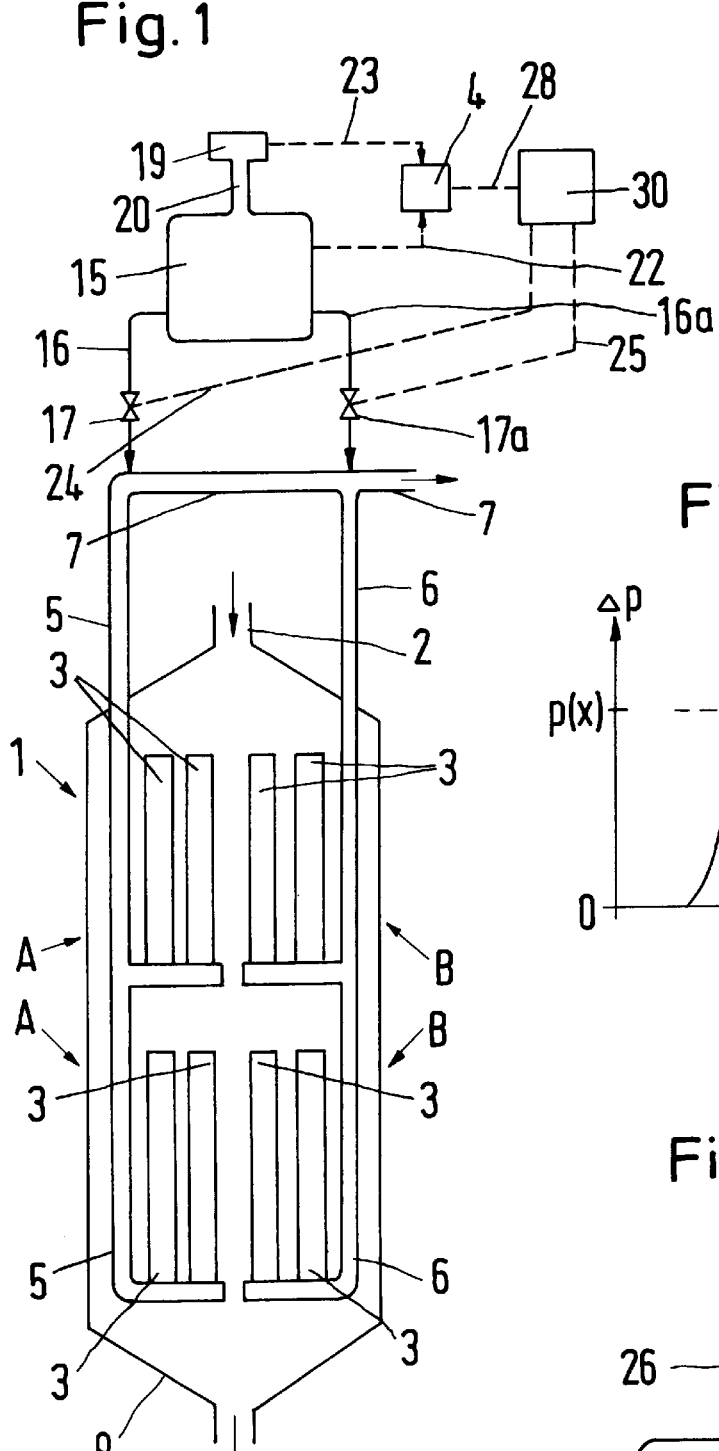
FIG. 1 shows a filtering plant in a schematic representation.

In the housing 1, the filtering plant shown in FIG. 1 has an inlet 2 for the raw gas to be dedusted. The raw gas may be hot and have temperatures up to about 1000° C. In the housing 1, numerous rigid filter elements 3 are provided, which are made of a porous, gas-permeable material, for instance ceramics. In the present case, the filter elements have the shape of hollow cylinders closed at the top. The outside of the cylinders is the raw gas side, and the interior belongs to the clean gas side. In accordance with FIG. 1, the filter elements form a first group (A) and a second group (B), which are each connected with separate clean gas passages 5 and 6. The dedusted gas is passed from the interior of the filter elements 3 through the clean gas passage 5 or 6 to the collecting passage 7 and is withdrawn. The dust separated is detached from the outside of the filter elements, drops to the housing bottom 9 and is discharged.

After a certain operating period it is expedient to largely liberate the raw gas side of the filter elements from adhering dust. For this purpose, one or more gas pulses (pulse gas) are passed from a pressure vessel 15, for instance through line 16 and the briefly opened valve 17, into the clean gas passage 5, into the interior of the filter elements 3 and through the porous wall thereof to the outside. An analogous procedure is used for cleaning the filter elements 3 of group B, in that the valve 17a is briefly opened and pulse gas is passed through line 16a, through the clean gas passage 6 and into the associated filter elements 3. The pressure vessel 15 is filled for instance with air or another gas, its maximum pressure is much higher than the pressure in the housing 1. The pressure in the vessel 15 usually is a multiple of the pressure in the housing 1. For generating a gas pulse, the valve 17 or 17a is opened for a short period usually in the range from 0.1 to 1 sec, whereupon the pressure in the vessel 15 is clearly decreasing.

With the pressure vessel 15 a measuring chamber 19 is connected via a passage 20. Usually, the volume of the vessel 15 is a multiple of the volume of the chamber 19. The passage 20 has a relatively small inner diameter, which usually lies in the range from 0.2 to 50 mm.

Through lines 22 and 23 a pressure difference measuring means 4 is connected with the pressure vessel 15 and the measuring chamber 19, and a signal line 28 leads to the control unit 30. Furthermore, there are provided signal lines 24 and 25 leading to the valves 17 and 17a.

As soon as for instance the-valve 17 is briefly opened, in order to introduce pulse gas into the passage 5, there is temporarily obtained a pressure difference $\Delta p = p1 - p2$, where p1 is the static pressure in the measuring chamber 19, and p2 is the static pressure in the pressure vessel 15.

Figure 2:
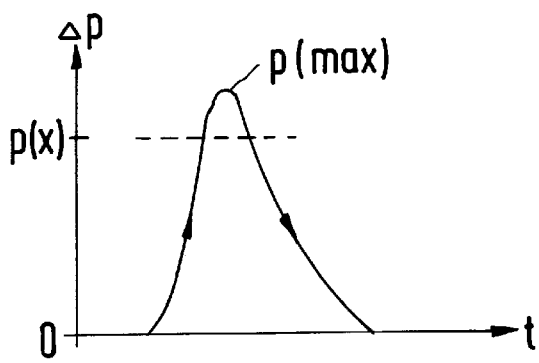
FIG. 2 shows the time course of the pressure difference.

FIG. 2 shows a short-time increase of this pressure difference within a few milliseconds in dependence on the time t up to a maximum pressure p(max) and the subsequent quick decrease of the pressure difference to a value 0. The control unit 30 detects whether the pressure p(max) is higher, equal to or lower than a threshold value p(x). When p(max) does not reach the value p(x), an alarm is activated expediently. When it is for instance provided to clean the filter group A, and for this purpose the valve 17 is briefly opened, too low a pressure difference is obtained in the pressure course shown in FIG. 2, when the valve 17 is not or not correctly opened.

Figure 3:
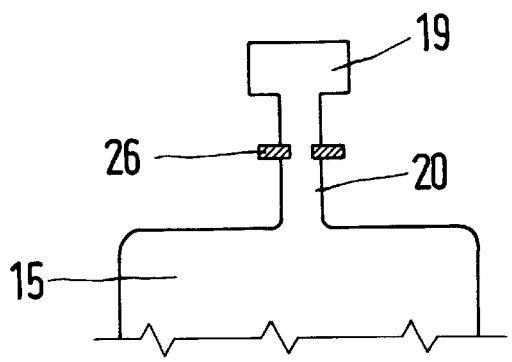
FIG. 3 shows an embodiment of the passage between the measuring chamber and the pressure vessel.

By means of an early recognition of a valve failure it is possible to avoid consequential damages in the filtering process, such as:

increase of the loss in filtering pressure due to filter elements that have not been cleaned, formation of dust bridges between the filter elements, and breaking of filter elements FIG. 3 is a schematic representation of an obstacle or diaphragm 26 provided in the passage 20, which is designed so as to be adjusted or at least be replaced. By means of the diaphragm 26, the flow cross-section can be adjusted for the gas flowing in the passage 20 from the measuring chamber 19 to the pressure vessel 15, and thus the desired course of the pressure difference over time, see FIG. 2, can be regulated as desired.

EXAMPLE

A filtering plant corresponding to the drawing has 56 filter elements 3 made of ceramics. To the housing 1, a raw gas of 850° C. is supplied, which contains 30 g dust per $Nm^3$, and the pressure in the housing 1 is 12 bar. The clean gas withdrawn from the plant through the collecting passage 7 still contains dust in en amount of 3 $mg/Nm^3$.

The vessel 15 has a volume of 0.34 $m^3$, it contains air of 22 bar and 50° C. When cleaning the filter elements, the pressure in the vessel 15 periodically drops to 20 bar. The measuring chamber 19 has a volume of only 1 liter, the diaphragm 26 in the connecting passage 20 leaves an opening with a diameter of 1 mm for the air flow. When pulse gas flows out, p(max)=1.5 bar; the threshold value p(x) is about 1 bar.

What is claimed is:

1. A process of monitoring the operability of a filtering plant for dedusting a raw gas containing dust, wherein said plant comprises a plurality of porous, gas-permeable filter elements, each having a raw gas side and a clean gas side and wherein the raw gas flows towards said raw gas side and dust adheres to the raw gas side, the gas penetrates through said filter elements, the clean gas side of each filter element is connected to a clean gas passage, and wherein said plant comprises a pressure vessel containing a dust-removing gas under superatmospheric pressure, at least one line (16) containing a valve (17) connects said pressure vessel with said clean gas passage, said valve being periodically opened for feeding at least one jet of said dust-removing gas as pulse gas into said clean gas passage and to the clean gas side of the filter elements for detaching dust from the filter elements, a measuring chamber being connected by a gas-permeable passage with said pressure vessel, said measuring chamber having a smaller volume than said pressure vessel and being also filled with dust-removing gas, and wherein, while dust-removing gas is flowing out of said pressure vessel and through said opened valve to the filter elements, the pressure difference $\Delta p = p1 - p2$ is measured and monitored, where p1 is the static pressure in said measuring chamber and p2 is the static pressure in said pressure vessel.

2. The process as claimed in claim 1, wherein an alarm signal is released when the maximum of the pressure difference falls below a predetermined minimum value.

3. The process as claimed in claim 1, wherein the passage between the pressure vessel and the measuring chamber has an orifice plate determining the flow cross-section.

* * * * *